United States Patent
Ledbetter et al.

(10) Patent No.: US 11,913,835 B1
(45) Date of Patent: Feb. 27, 2024

(54) VECTOR NOISE SUBTRACTION IN VAPOR CELL SPECTROSCOPY

(71) Applicant: Vector Atomic, Inc., Pleasanton, CA (US)

(72) Inventors: Micah Perry Ledbetter, Sunnyvale, CA (US); Martin Machai Boyd, Pleasanton, CA (US); Andrew Vernon Dowd, Pleasanton, CA (US); William David Lunden, Dublin, CA (US); Jonathan David Roslund, Pleasanton, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 0 days.

(21) Appl. No.: 18/353,175

(22) Filed: Jul. 17, 2023

(51) Int. Cl.
*G01J 3/433* (2006.01)

(52) U.S. Cl.
CPC ..... *G01J 3/4338* (2013.01); *G01J 2003/4332* (2013.01)

(58) Field of Classification Search
CPC ................. G01J 3/4338; G01J 2003/4332
USPC ................................................ 356/300, 303
See application file for complete search history.

(56) References Cited

U.S. PATENT DOCUMENTS

| | | | | |
|---|---|---|---|---|
| 4,193,690 A * | 3/1980 | Levenson | ............ | G01J 3/44 356/301 |
| 4,856,899 A * | 8/1989 | Iwaoka | ............ | G01J 9/04 356/28.5 |
| 6,094,267 A * | 7/2000 | Levenson | ............ | G01N 21/39 356/484 |
| 7,003,438 B1 | 2/2006 | Dowd et al. | | |
| 2020/0041257 A1* | 2/2020 | Egan | ............ | H01S 5/4012 |
| 2020/0041379 A1* | 2/2020 | Douglass | ............ | G02B 6/3588 |
| 2020/0341081 A1* | 10/2020 | Mohseni | ............ | G01R 33/26 |
| 2022/0299584 A1 | 9/2022 | Ledbetter et al. | | |

OTHER PUBLICATIONS

U.S. Appl. No. 17/933,735 for titled "Noise Mitigation in Vapor Cell Spectroscopy," filed Sep. 20, 2022.
Simon Haykin, "Adaptive Filter Theory: Third Edition" Year: 2002, pp. 1-85.

* cited by examiner

*Primary Examiner* — Isiaka O Akanbi
(74) *Attorney, Agent, or Firm* — Patterson + Sheridan, LLP

(57) ABSTRACT

Embodiments herein describe spectroscopy systems that use an unmodulated reference optical signal to mitigate noise, or for other advantages. In one embodiment, the unmodulated reference optical signal is transmitted through the same vapor cell as a modulated pump optical signal. As such, the unmodulated reference optical signal experiences absorption by the vapor, which converts laser phase noise to amplitude noise like the other optical signals passing through the vapor cell. In one embodiment, the unmodulated reference optical signal has an optical path in the gas cell that is offset (or non-crossing) from the optical path of the modulated pump optical signal. The unmodulated reference optical signal allows removal or mitigation of the noise on the other optical signal.

20 Claims, 12 Drawing Sheets

VECTOR NOISE SUBTRACTION IN VAPOR CELL SPECTROSCOPY

STATEMENT OF GOVERNMENT INTEREST

This invention was made with government support under Contract No: HR001121C0175 awarded by the Defense Advanced Research Project Agency. The government has certain rights in the invention.

BACKGROUND

Field

Embodiments of the present invention generally relate to transmitting an unmodulated reference optical signal through a vapor cell to mitigate noise when performing spectroscopy.

Description of the Related Art

The short-term instability of atomic clocks is limited by the achievable signal-to-noise ratio (SNR) of the measured atomic resonance feature of interest. The fundamental limit to the SNR is quantum-mechanical in origin and is given by the shot-noise limit. In practice, however, laser noise often dominates the shot-noise limit and reduces the achievable SNR. For instance, amplitude noise fluctuations of the laser above the shot-noise limit are directly imprinted upon the error signal noise floor. In the case of vapor cells (also referred to as gas cells), the wavelength-dependent absorption experienced by the probe beam serves as a discriminant for converting laser phase noise (PM) into amplitude noise (AM). This PM to AM noise conversion depends upon the experimental conditions (e.g., vapor temperature) and directly adds to the detected signal, thereby obscuring the resonance feature of interest. This noise conversion process has been recognized as a limiting factor for a variety of vapor cell based atomic clocks, including but not limited to, coherent population trapping (CPT) atomic clocks, pulsed optically pumped (POP) clocks, and modulation transfer spectroscopy (MTS)-based platforms, such as molecular iodine, acetylene, or rubidium.

The impact of this PM to AM noise conversion may be passively mitigated with expensive, low phase-noise laser sources if available at the desired wavelengths. However, this drives up the cost significantly.

SUMMARY

One embodiment herein is a spectroscopy system that includes a vapor cell configured to receive as inputs an unmodulated reference optical signal and a modulated pump optical signal where the unmodulated reference optical signal and the modulated pump optical signal have separate and non-crossing optical paths in the vapor cell. The system also includes a control system that detects a first optical signal resulting from the unmodulated reference optical signal passing through the vapor cell and a second optical signal resulting from the modulated pump optical signal passing through the vapor cell and performs a vector subtraction of the first optical signal and the second optical signal to suppress noise.

Another embodiment herein is a method that includes modulating input light to generate a modulated pump optical signal, transmitting the modulated pump optical signal and an unmodulated reference optical signal through a vapor cell in a spectroscopy system using separate and non-crossing optical paths, determining amplitude filter parameters from optical signals resulting from transmitting the modulated pump optical signal and the unmodulated reference optical signal through the vapor cell, and determining a phase difference from the resulting optical signals.

Another embodiment herein is a spectroscopy system that includes a first vapor cell configured to receive as an input an unmodulated reference optical signal, a second vapor cell configured to receive as an input a modulated pump optical signal, and a control system. The control system detects a first optical signal resulting from the unmodulated reference optical signal passing through the first vapor cell and a second optical signal resulting from the modulated pump optical signal passing through the second vapor cell and performs a vector subtraction of the first optical signal and the second optical signal to suppress noise.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe spectroscopy systems that use an unmodulated reference optical signal to mitigate noise. In one embodiment, the unmodulated reference optical signal is transmitted through the same vapor cell as a modulated pump optical signal. As such, the unmodulated reference optical signal experiences absorption by the vapor, which converts laser phase noise to amplitude noise like the other optical signals passing through the vapor cell. In one embodiment, the unmodulated reference optical signal has an optical path in the gas cell that is spatially offset (or non-crossing) from the optical path of the modulated pump optical signal (and any other optical signal passing through the vapor cell). Put differently, the unmodulated reference optical signal does not interact with the other optical signal(s) passing through the same vapor cell. Hence, the converted noise that is present on the unmodulated reference optical signal upon exiting the vapor cell is highly correlated with the noise on the other optical signal(s) passing through the cell.

Post-processing can then use the unmodulated reference optical signal to remove or mitigate the negative impacts of PM to AM noise conversion, as well as other potential advantages described in more detail below. In one embodiment, the post-processing includes performing vector subtraction that considers both the amplitude and a phase difference between the reference optical signal and the modulated pump optical signal. For example, the reference optical signal may be scaled and phase shifted before being subtracted from the signal of interest (e.g., a signal derived from the pump or probe optical signal). The scaling and phase shift can be performed before or after demodulating the reference optical signal.

Further, the embodiments herein can be applied with any spectroscopy system that experiences laser noise (whether from PM to AM noise conversion or from some other source) that can be abated by using an unmodulated reference signal. Two non-limiting examples of spectroscopy techniques that can benefit from using an unmodulated reference signal are MTS and Frequency Modulation Spectroscopy (FMS). The embodiments herein can provide improved results while using only one vapor cell (e.g., without the use of secondary vapor cells) and without having to rely on costly low phase-noise laser sources. However, in other embodiments, a secondary vapor cell can still be used.

Figure 1:
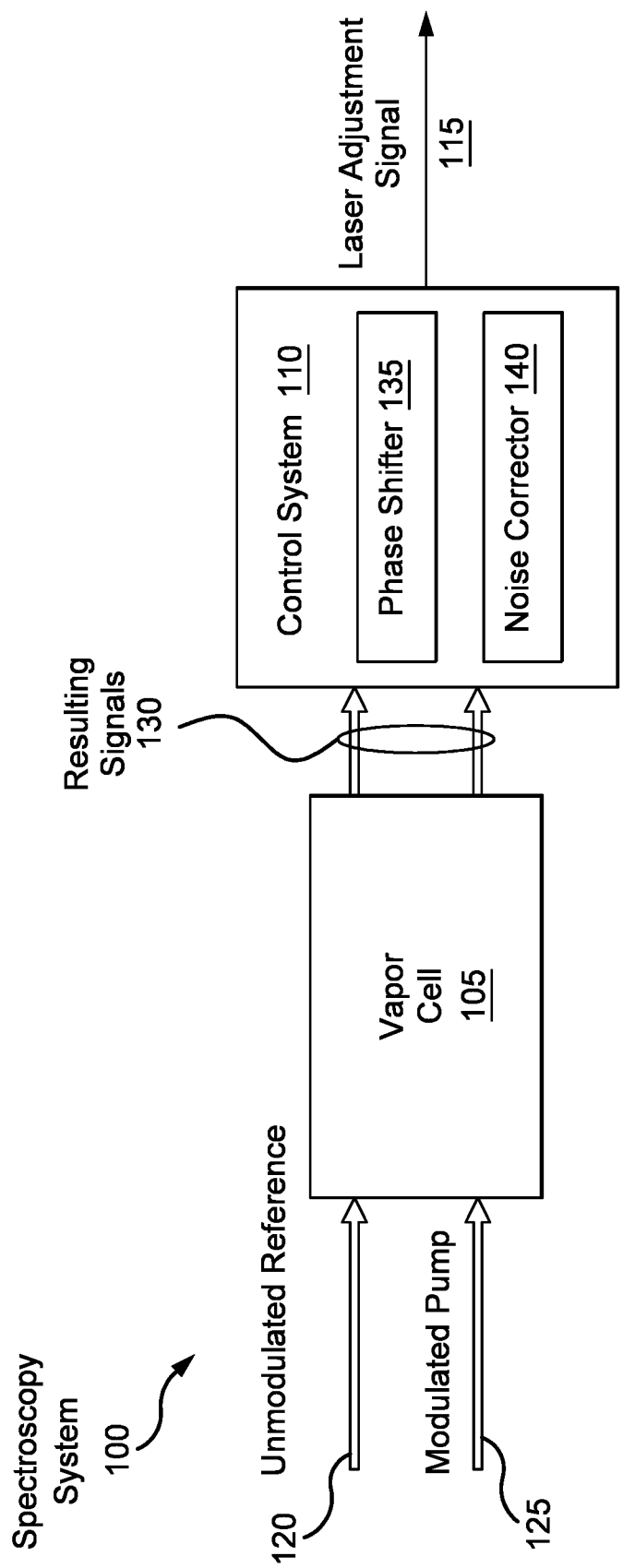
FIG. 1 is a block diagram of a spectroscopy system, according to one embodiment.

FIG. 1 is a block diagram of a spectroscopy system 100, according to one embodiment. The system 100 includes a vapor cell 105 and a control system 110. The vapor cell 105 is a container (e.g., a tube) that contains atoms or molecules that have a well-defined absorption spectrum. At least a portion of the sides or walls of the vapor cell 105 is transparent so that optical signals can enter and leave the cell 105. Light absorption can be measured while changing the wavelength of an optical signal being transmitted through the vapor cell 105 which results in a peak or a series of peaks. However, the definition of the peak can vary based on the type of spectroscopy being implemented. At a peak, the optical signal is absorbed by the vapor in the cell 105 while at other wavelengths, the optical signal passes through the vapor cell 105 with minimal absorption.

In this embodiment, the vapor cell 105 has two inputs that receive an unmodulated reference optical signal 120 and a modulated pump optical signal 125, respectively. The optical signals 120 and 125 can pass through the vapor cell 105 in parallel but along different optical paths. In one embodiment, the paths of the optical signals 120 and 125 are spaced apart or offset such that the optical signals 120 and 125 do not interact in the vapor cell 105 (e.g., the modulation on the modulated pump optical signal 125 is not imparted to the unmodulated reference optical signal 120). In one embodiment, to prevent any interaction, the optical paths of the optical signals 120 and 125 do not cross in the vapor cell 105 (i.e., non-crossing paths). In one embodiment, the optical paths of the optical signals 120 and 125 in the vapor cell 105 are separated by a distance that is at least double the diameter of the modulated pump optical signal 125. In this manner, the modulation on the modulated pump optical signal 125 is not imparted to the unmodulated reference optical signal 120.

As described in more detail below, the modulated pump 125 may be modulated (e.g., dithered) where its frequency/wavelength is changed in order to identify a peak in the absorption spectrum of the vapor cell 105. Identifying a peak can be used to ensure the carrier wavelength of the modulated pump optical signal 125 is at a precise wavelength. That is, by identifying when the wavelength of the modulated pump optical signal 125 is at a peak of the absorption spectrum, the control system 110 can lock the optical source (not shown) that generates the modulated pump 125 to the wavelength corresponding to the peak. This optical source can then be used in precise timing applications such as atomic clocks as well as other applications.

The unmodulated reference optical signal 120 can be used by the control system 110 (e.g., hardware (e.g., electronics, integrated circuit, field programmable gate array, etc.), software, or combinations thereof) to mitigate or remove the negative impacts of intensity and frequency noise.

The control system 110 detects optical signals 130 resulting from the unmodulated reference optical signal 120 and the modulated pump optical signal 125 passing through the vapor cell 105. In one embodiment, the control system 110 uses a photodiode (PD) to directly detect the unmodulated reference optical signal 120 after passing through the vapor cell 105 one or more times. That is, the modulated pump optical signal 125 is one of the resulting signals 130 detected by the control system 110. Alternatively, the control system 110 can use fluorescence detection from separate imaging of regions of the cell containing the unmodulated and modulated laser beams. In this example, the unmodulated reference optical signal 120 may not be directly detected, but rather the resultant signals 130 being detected can include the fluorescence of the vapor cell 105. In either case, the control system 110 can then process the electrical signals derived from the optical signal 120 to remove the noise, which reduces the noise floor and improves the SNR.

In this embodiment, the control system 110 includes a phase shifter 135 and a noise corrector 140. The phase shifter 135 can phase shift one (or both) of the resulting signals 130 so that the resulting signal 130 of interest is aligned with the resulting signal corresponding to the unmodulated reference signal 120.

In one embodiment, the noise corrector 140 scales one (or both) of the resulting signals 130; however this is optional. In any case, the noise corrector 140 subtracts the phase aligned resulting signals 130 which reduces the impact of noise in the spectroscopy system 100. The various ways of mitigating the noise in the system 100 using the unmodulated reference signal 120 is discussed in FIGS. 2-6.

The resulting signals 130 can include other optical signals after they pass through the vapor cell 105. For example, in MTS, a probe optical signal is one of the resulting signals 130, which is described in FIG. 7. In FMS, the modulated pump 125 is detected by the control system 110 after passing through the vapor cell 105, which is discussed in FIG. 8. These resulting signals 130 can be detected either directly or by using fluorescence detection.

The spectroscopy system 100 has other potential advantages such as using the unmodulated reference optical signal 120 to suppress laser relative intensity noise (RIN) which is common to both optical signals 120 and 125 prior to their passage through the vapor cell 105. Moreover, the control system 110 can use the unmodulated reference optical signal 120 to suppress parasitic (inadvertent) modulation where the modulation on the modulated pump optical signal 125 may inadvertently transfer to a probe optical signal (mechanism of transfer not shown in FIG. 1) before the optical signals pass through the vapor cell 105. Because this parasitic modulation may also be found on the reference optical signal 120, the control system 110 can use the reference optical signal 120 to remove the parasitic modulation from the probe optical signal.

The control system 110 detects the resulting signals 130 and outputs a laser adjustment signal 115 for adjusting the optical source that generates the modulated pump optical signal 125, which in some embodiments is the same optical source that generates the unmodulated reference 120. For example, the control system 110 can sweep the carrier frequency or wavelength of the modulated pump optical signal 125 until it matches a peak in the absorption spectrum of the vapor in the cell 105. The control system 110 can continue to monitor resulting signals 130 to keep the carrier frequency or wavelength of the modulated pump optical signal 125 locked to the frequency corresponding to the peak in the absorption spectrum using the laser adjustment signal 115. Thus, as environmental conditions change (e.g., change in temperature, humidity, etc.) or as the optical source ages, the spectroscopy system 100 can keep the optical source outputting a signal at the desired wavelength or frequency which matches a peak in the absorption spectrum of the vapor cell 105.

The spectroscopy system 100 in FIG. 1 can be used in MTS and FMS. Examples of using the system 100 in MTS are described in FIG. 8 while examples of using the system 100 in FMS are described in FIG. 9. However, the spectroscopy system 100 is not limited to MTS and FMS and may be useful in other spectroscopy implementations.

Figure 2:
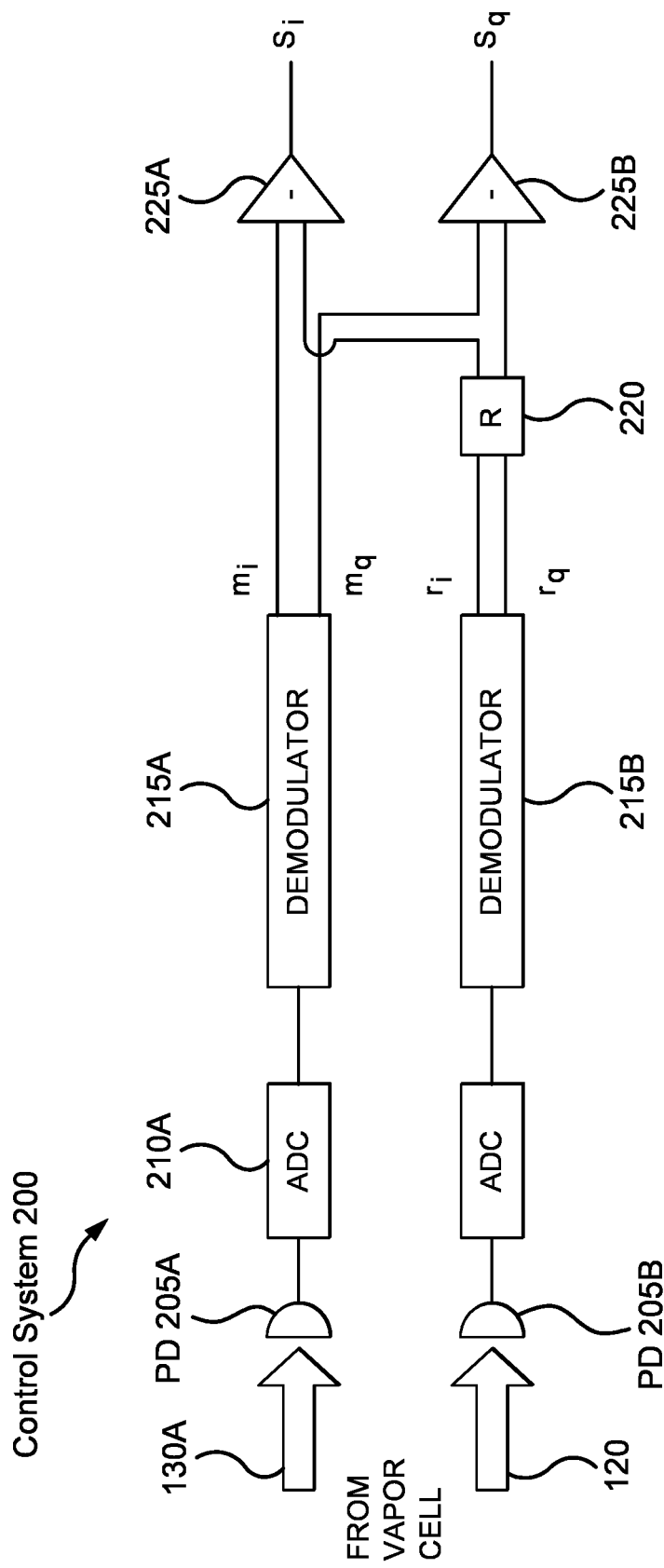
FIG. 2 is a block diagram of a spectroscopy system for performing vector noise subtraction, according to one embodiment.

FIG. 2 is a block diagram of a control system 200 in a spectroscopy system for performing vector noise subtraction, according to one embodiment. As shown, the control system 200 receives a resulting signal 130A and the unmodulated reference signal 120 which result from passing the modulated pump optical signal and the unmodulated reference signal 120 through the vapor cell as shown in FIG. 1. As discussed above, the resulting signal 130A can be a signal that is directly detected after the modulated pump signal or a probe signal passes through the vapor cell. Alternatively, the resulting signal 130A can be a result of fluorescence detection of the pump or probe signal as it passes through the vapor cell.

The resulting signal 130A is detected by a PD 205A while the reference signal is detected by a PD 205B. The PDs 205 generate respective analog electrical signals which are converted into digital signals by analog-to-digital converters (ADCs) 210. The digital signals are then demodulated. As shown, a demodulator 215A generates IQ (quadrature) signals (i.e., $m_i$ and $m_q$) for the resulting signal 130A while the demodulator 215B generates IQ signals (i.e., $r_i$ and $r_q$) for the reference signal 120.

The IQ signals for the reference signal 120 are phase shifted using a rotation matrix (R) 220 and scaled using a scaler. For example, there may be phase shifts in the electronics, or phase shifts due to different group velocities in the probe and reference beams (i.e., the resulting signal 130A and the reference signal 120) because of the presence of a pump beam. If the analog or digital signals generated from the resulting signals 130A and the reference signal 120 are subtracted without performing the phase shift using the rotation matrix 220, the resulting noise suppression may be compromised. This is discussed in FIGS. 5A and 5B.

After scaling and phase shifting the digital signal for the reference signal 120, the I and Q portions of the digital signals can be subtracted using the subtraction circuits 225A and 225B. This is a vector subtraction since it considers both the amplitude and a phase difference between the reference optical signal 120 and the resulting signal 130A. The resulting signals $S_i$ and $S_q$ can have reduced noise relative to the signals $m_i$ and $m_q$. In this example, the control system 200 reduces the impact of phase shifts by first demodulating the electrical signals corresponding to the probe and reference optical signals and then scaling and rotating the reference quadratures before subtracting the quadratures for the resulting signal 130A to result in the signals $S_i$ and $S_q$.

In FIG. 2, the rotation matrix 220 is one example implementation of the phase shifter 135 in FIG. 1. Also, the subtraction circuits 225 are one example implementation of the noise corrector 140 in FIG. 1.

Figure 3:
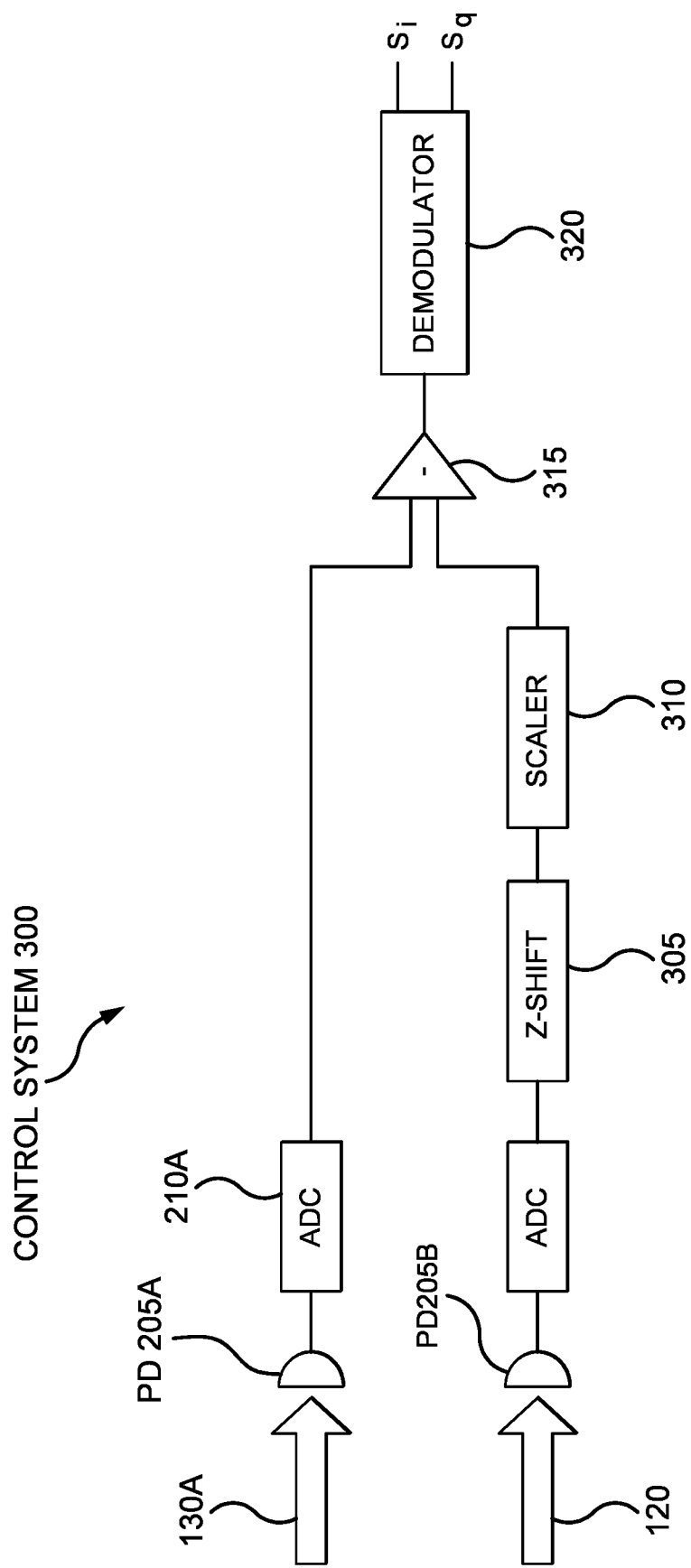
FIG. 3 is a block diagram of a spectroscopy system for performing vector noise subtraction, according to one embodiment.

FIG. 3 is a block diagram of a control system 300 in a spectroscopy system for performing vector noise subtraction, according to one embodiment. Like in FIG. 2, the control system 300 receives the resulting signal 130A and the unmodulated reference signal 120 which are then converted into digital signals using the PDs 205 and ADCs 210. However, before demodulating the signals, a delay block 305 (z-shift) delays or phase shifts the digital signal derived from the reference optical signal 120. A scaler circuit 310 (which is optional) can then scale the intensity or amplitude of the digital signal.

The output of the scaler circuit 310 is then subtracted with the output of the ADC 210 which mitigates the intensity and frequency noise in the resulting signal 130A. The output of the subtraction circuit 315 is then demodulated by a demodulator 320 to generate the quadrature signals $S_i$ and $S_q$.

Unlike in FIG. 2 where the noise mitigation occurs after demodulating the digital signals, in FIG. 3 noise suppression occurs before demodulation. This does not allow as fine an adjustment as can be achieved by adjusting the parameters of the rotation matrix 220 in FIG. 2, but has the advantage of using a single demodulator 320 which means less circuitry can be used in the control system 300.

In FIG. 3, the delay block 305 is one example implementation of the phase shifter 135 in FIG. 1. Also, the subtraction circuit 315 (or the combination of the scaler circuit 310 and the subtraction circuit 315) is one example implementation of the noise corrector 140 in FIG. 1.

Figure 4A:
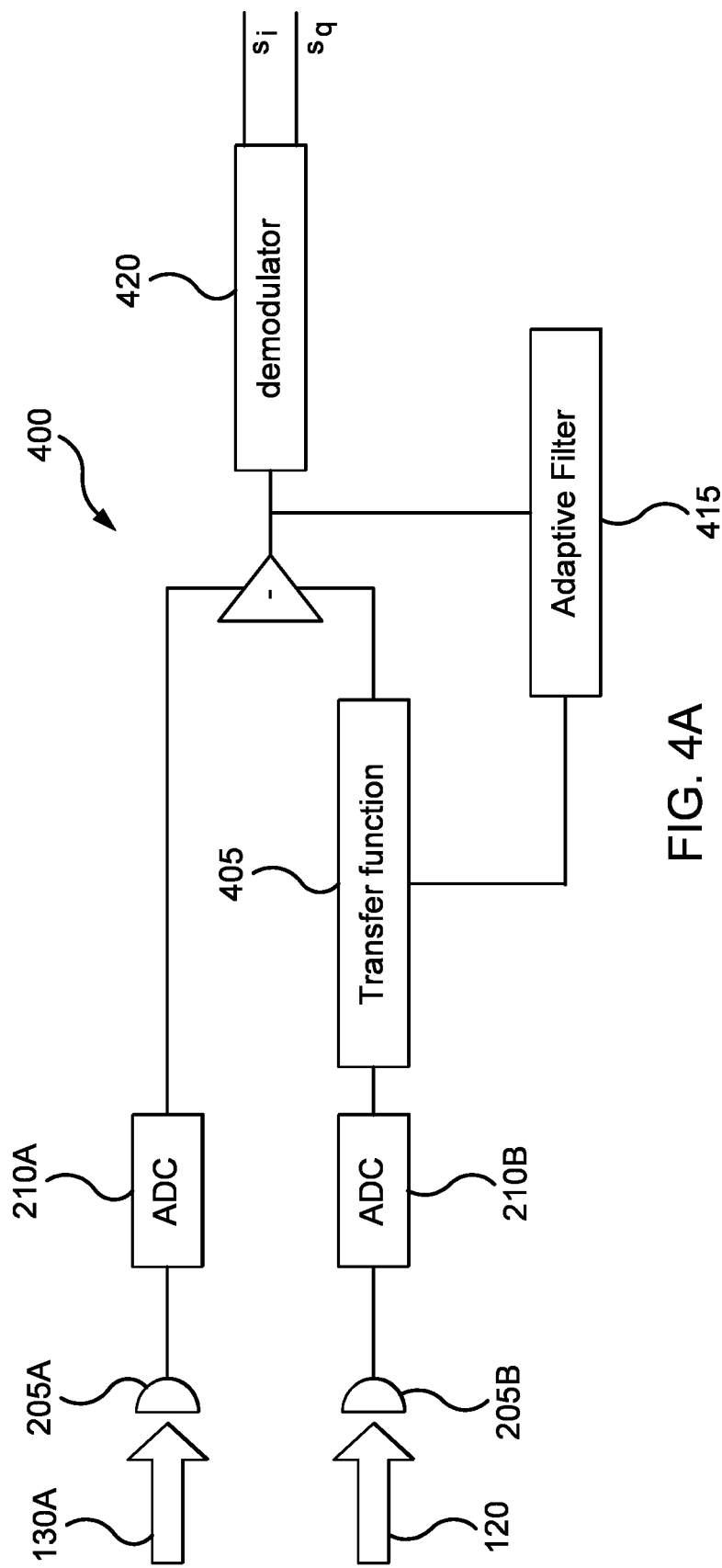
FIGS. 4A and 4B are block diagrams of spectroscopy systems for performing vector noise subtraction, according to one embodiment.
Figure 4B:
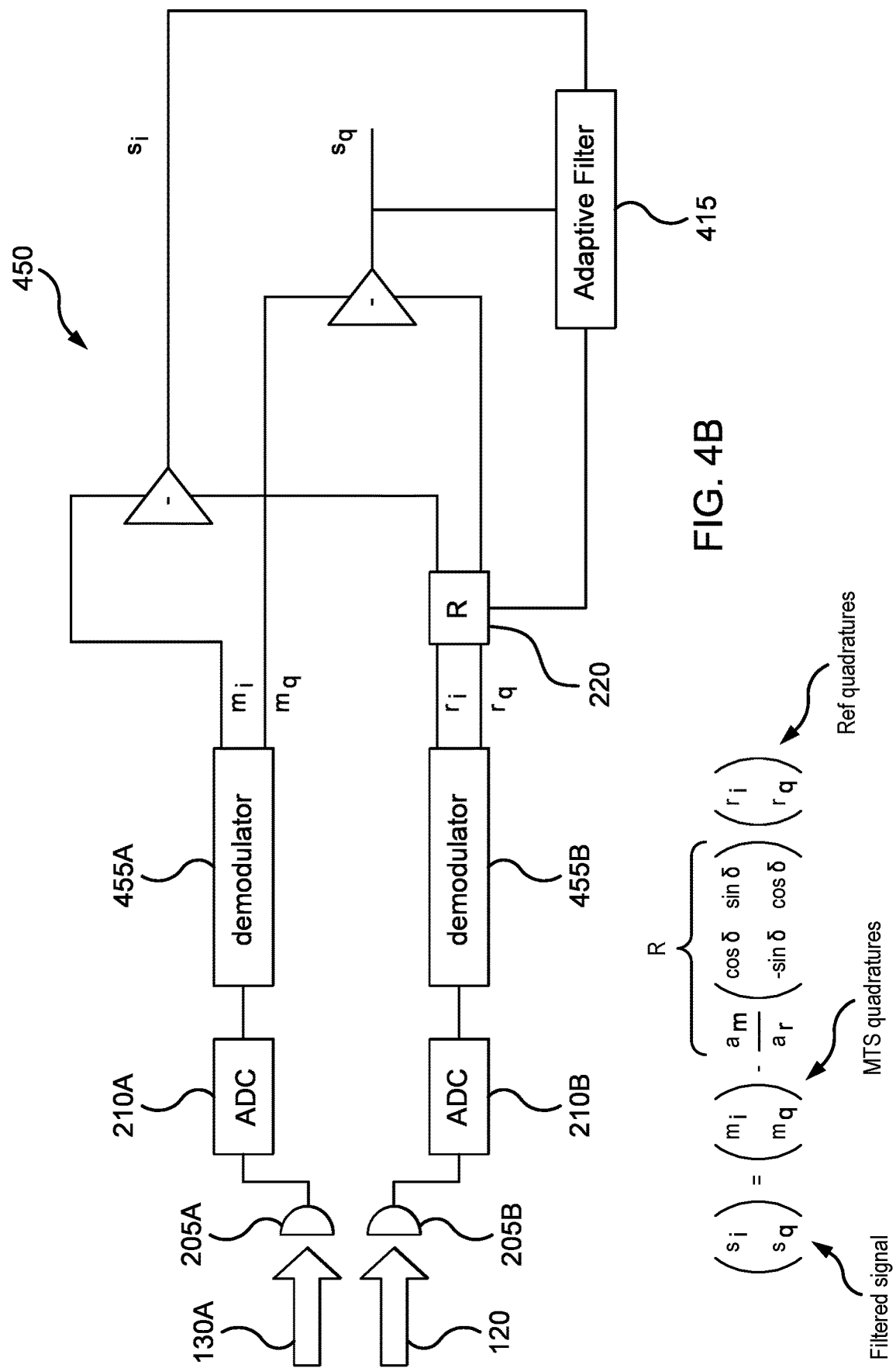

FIGS. 4A and 4B are block diagrams of control systems in a spectroscopy system for performing vector noise subtraction, according to one embodiment. Instead of rotating and scaling two vector signals as shown in FIGS. 2 and 3, the control systems in FIGS. 4A and 4B perform an adaptive algorithm, such as least mean squares filters.

Like in FIGS. 2 and 3, the control system 400 in FIG. 4A receives the resulting signal 130A and the unmodulated reference signal 120 which are then converted into digital signals using the PDs 205 and ADCs 210.

The reference signal passes through a transfer function 405 of arbitrary order, whose parameters are continuously adjusted by an adaptive filter 415 which uses an algorithm to minimize noise at the input to a demodulator 420. The adaptive filter 415 may be implemented either in the fabric of the FPGA or on a microprocessor. The output of the transfer function 504.

The control system 450 in FIG. 4B also receives the resulting signal 130A and the unmodulated reference signal 120 which are then converted into digital signals using the PDs 205 and ADCs 210. The digital signals are then demodulated by demodulators 455A and 455B. A similar scheme as discussed in FIG. 2 can be used where the IQ signals for the reference signal 120 are phase shifted using the rotation matrix (R) 220 and scaled using a scaler.

FIG. 4B also shows that the adaptive filter 415 are applied to the implementation shown in FIG. 2, where the inputs to the adaptive filter 415 are the two quadratures $s_i$ and $s_q$. The output of the adaptive filter 415 is the phase difference $\delta$ and ($a_m/a_r$). The adaptive filter 415, the demodulators 455, and the rotation matrix 220 may be implemented either in the fabric of the FPGA or on a microprocessor.

Notably, control system 400 in FIG. 4A applies the adaptive filter 415 before performing demodulation while the control system 450 applies the adaptive filter 415 after performing demodulation.

Figure 5A:
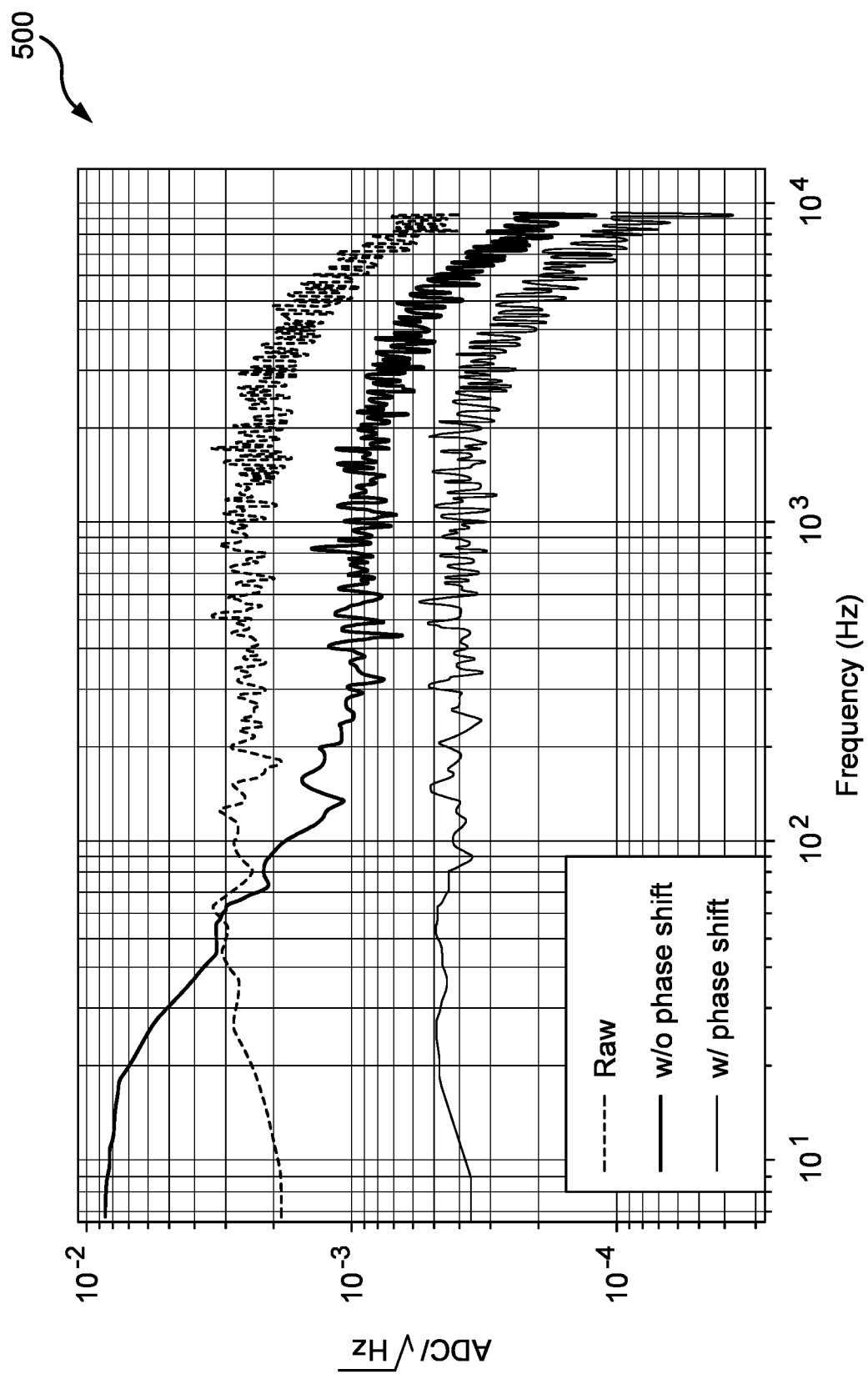
FIGS. 5A and 5B illustrates noise suppression using different mitigation techniques.
Figure 5B:
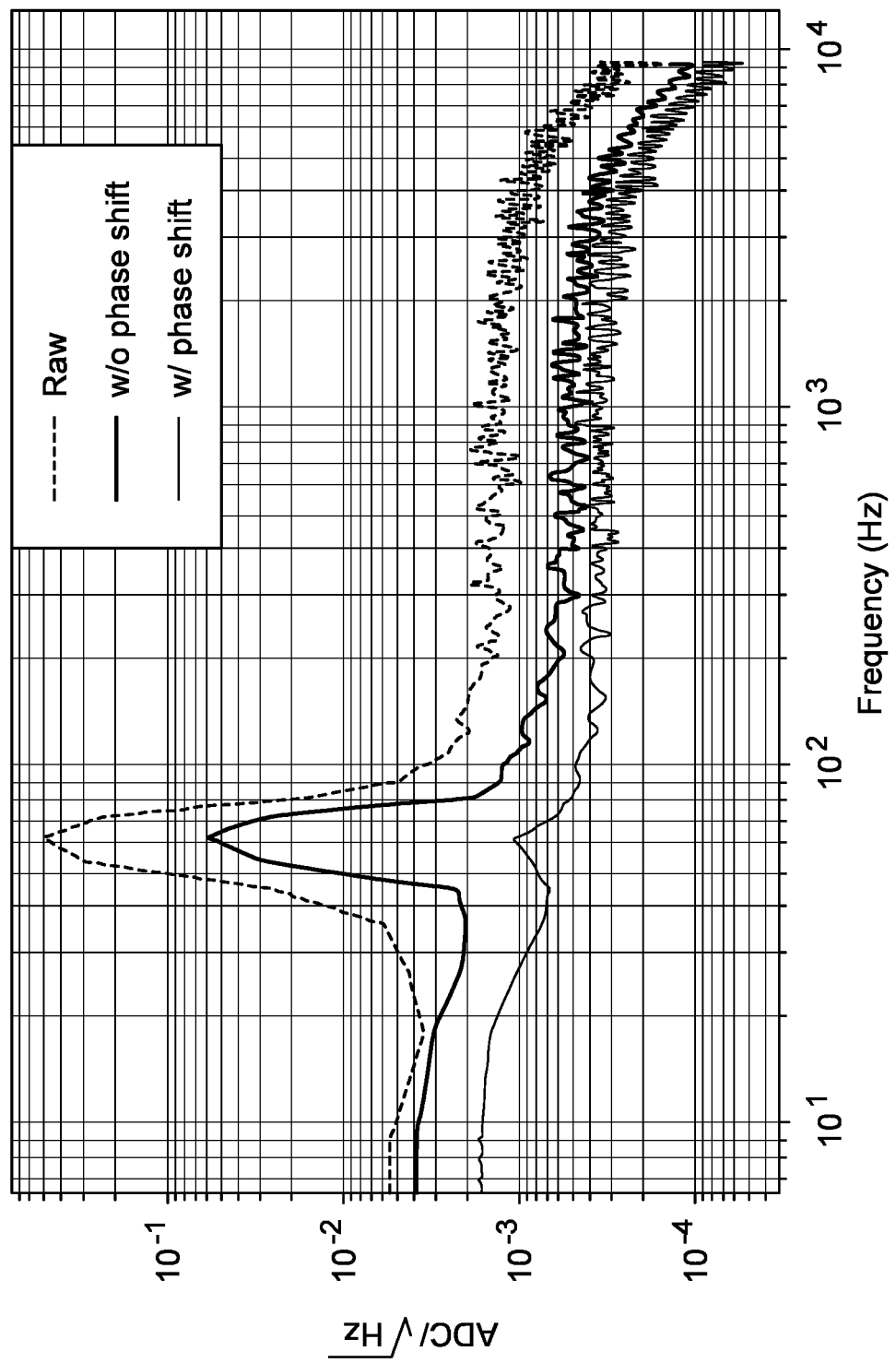

FIGS. 5A and 5B illustrate noise suppression using different mitigation techniques. Specifically, FIG. 5A illustrates a comparison of noise in the raw modulated pump or probe signal after passing through the vapor cell (e.g., the resulting signal 130A in FIGS. 2-4), when subtracted from the reference optical signal (e.g., the unmodulated reference signal 120 in FIGS. 2-4) without performing a phase shift, and with performing a phase shift. The Y axis represents the noise in the three signals while the X axis represents the frequency domain.

If the raw modulated pump/probe signal is directly subtracted from the reference signal (without performing a phase shift), there is a reduction of noise but it is limited due to there being a phase difference between the modulated pump/probe signal and the reference optical signal. However, if the raw signal is subtracted from the reference signal after performing a phase shift as shown in FIGS. 2 and 3 (or by using the adaptive algorithm as shown in FIG. 4), the reduction of noise is greater. In one embodiment, the noise suppression by performing a phase shift is about a factor of two better than subtracting the reference signal without performing a phase shift.

Chart 550 in FIG. 5B illustrates the same signals as shown in chart 500 but with a calibration peak. Chart 550 illustrates an approximately 50 times better suppression of noise at the frequency of the calibration peak when subtracting a phase shifted reference signal from the raw signal as compared to using the non-phase shifted reference signal. Because of this improvement, a less expensive laser could be used which has a higher RIN since the embodiments herein can suppress or remove much of this noise.

Figure 6:
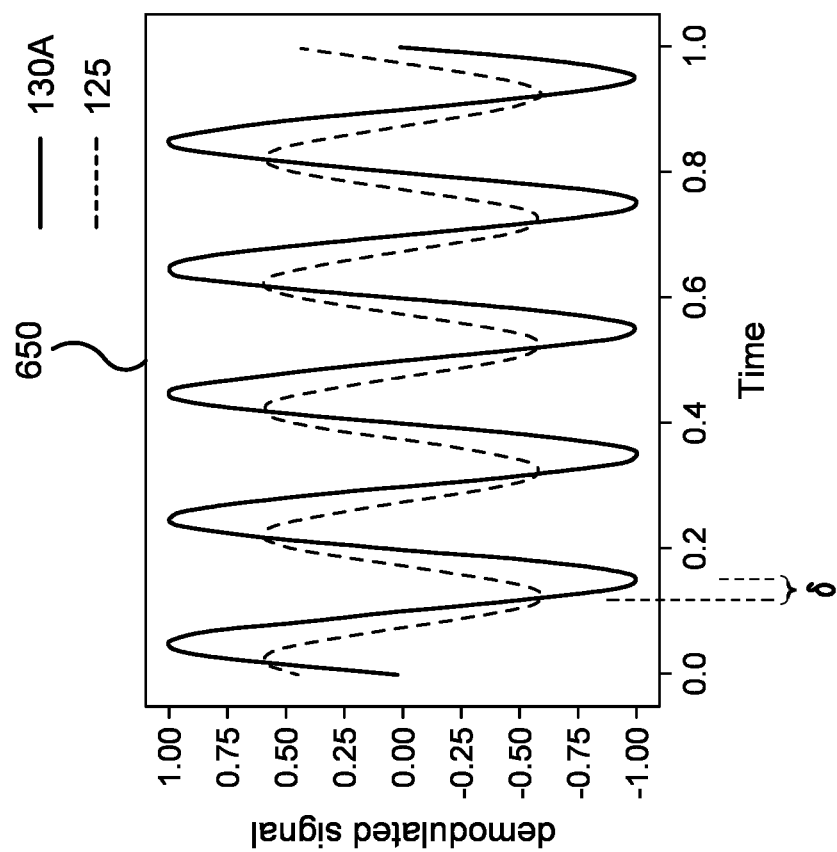
FIG. 6 is a block diagram of calibrating a system to perform vector noise subtraction, according to one embodiment.
Figure 6:
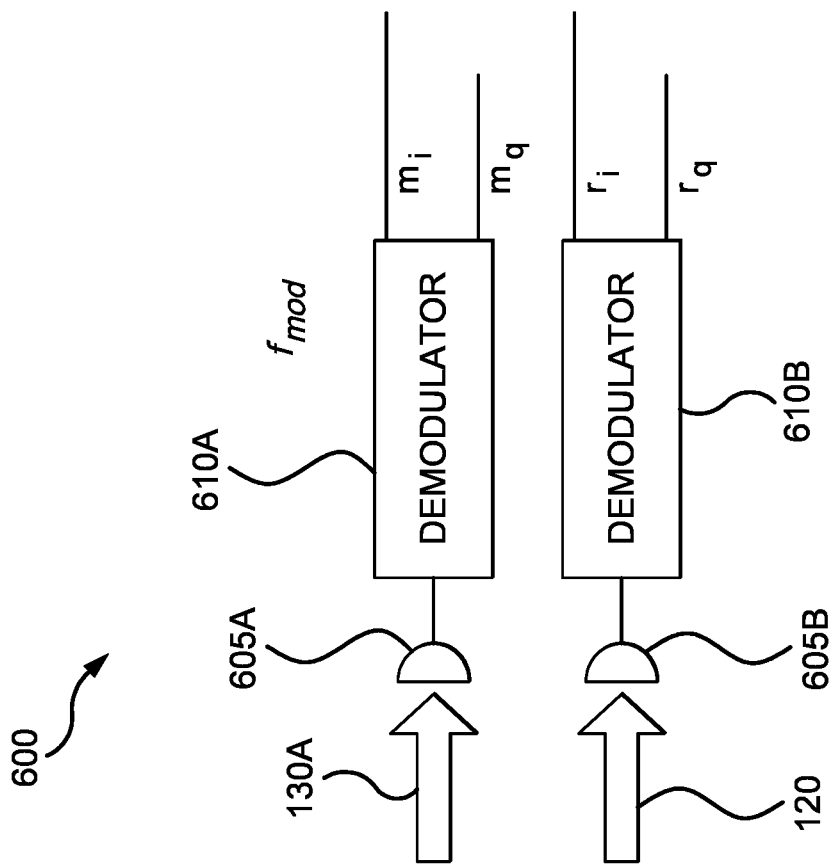

FIG. 6 is a block diagram for calibrating a control system 600 to perform vector noise subtraction, according to one embodiment. The control system 600 receives the resulting signal 130A and the unmodulated reference signal 120 which are then converted into digital signals using the PDs 605 and ADCs. These digital signals are then demodulated using the demodulators 610.

Figure 7:
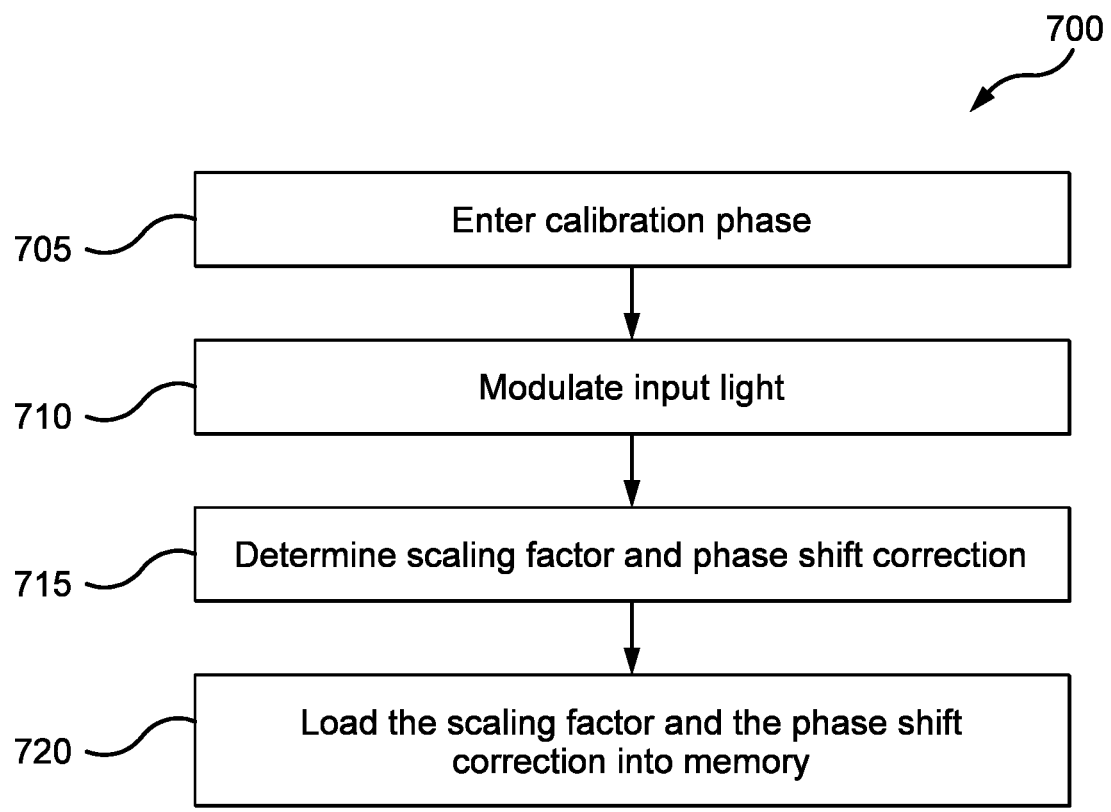
FIG. 7 is a flowchart for calibrating a spectroscopy system to perform vector noise subtraction, according to one embodiment.

For ease of explanation, the control system 600 is discussed in tandem with FIG. 7 which is a flowchart of a method 700 for calibrating the control system 600 in FIG. 6 to perform vector noise subtraction, according to one embodiment. At block 705, the control system enters a calibration phase. The control system may perform calibration once in the factory or each time it powers up. The control system may also recalibrate based on changing environmental conditions or based on a timer (e.g., at preset intervals).

At block 710, the optical source that inputs light to generate the pump optical signal—i.e., the laser source that generates the resulting signal 130A—is modulated. In one embodiment, the optical source is frequency or phase modulated at a frequency $F_{mod}=F_{FMS}+\Delta$, where $F_{FMS}$ is the modulation frequency at which the spectroscopy is to be performed and A is a frequency offset. In another embodiment, the optical source is intensity modulated at $F_{mod}$. For example, a sinusoidal intensity (or frequency or phase) modulation at $F_{mod}$ may be applied to the input light at a frequency near the spectroscopy modulation frequency $F_{FMS}$ (e.g., the MTS modulation frequency or the FMS modulation frequency). In one example, the frequency $F_{mod}$ may be in the range of 50 to 400 kHz.

The outputs of the demodulators 610 operating at the frequency $F_{FMS}$ have a sinusoidal component at a detuning frequency ($\Delta$), as shown by the chart 650 in FIG. 6. In one embodiment, the detuning frequency, $\Delta$, is small compared to a low pass filter corner in the demodulators 610.

At block 715, the control system 600 determines the scaling factor and a phase shift correction for the reference signal 120 (or the resulting signal 130A). The scaling factor scales the digitally de-modulated version of the reference signal 120. The scaling factor can be expressed as a m and a r and can be determined from the amplitude of the resulting sinusoids in each of the demodulators 610, respectively.

At block 715, the control system 600 also determines the phase shift correction for the reference signal 120 (or the resulting signal 130A). The phase shift correction $\delta$ (or phase difference between the signals 130A and 120) can be expressed as:

$$\delta = \varphi_m - \varphi_r$$

The phase shift correction can be determined from the relative phase of the sinusoids in each of the demodulated signals to the demodulation frequency $F_{FMS}$.

In the case where the detuning frequency, A is zero, the amplitudes and phases for the resulting signal (m) can be determined by the equations $$a_m = \sqrt{m_i^2 + m_q^2}$$
$$\varphi_m = \tan^{-1} m_q/m_i,$$

Similar expressions can be used to determine the amplitudes and phases for the reference signal (r).

At block 720, the scaling factor and the phase shift correction are loaded into memory and can be used as filter parameters to perform vector subtraction as discussed above. For example, these filter parameters can be used in the rotation matrix 220 in FIG. 2 or to configure the delay block 305 and the scaler circuit 310 in FIG. 3.

Figure 8:
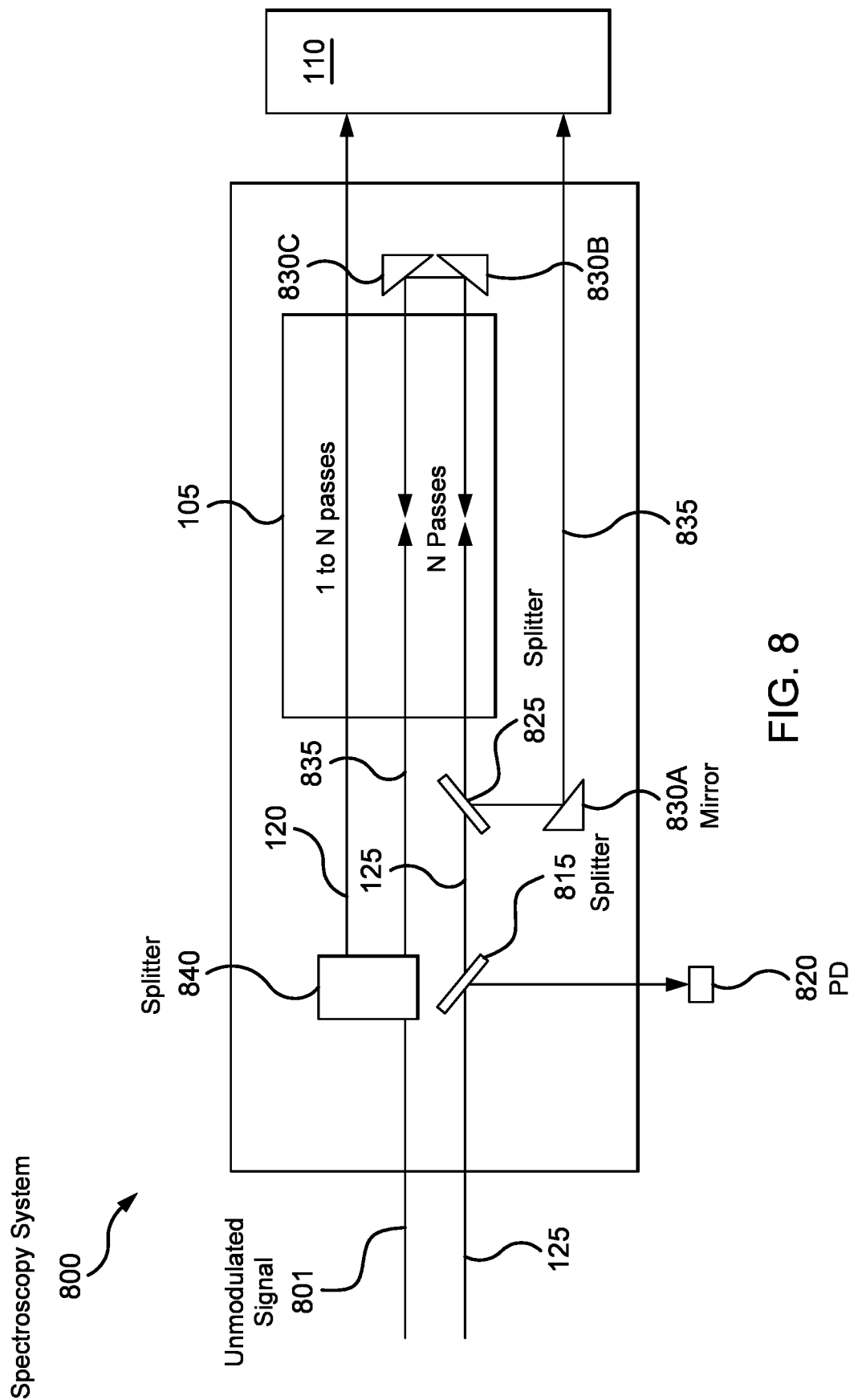
FIG. 8 illustrates a spectroscopy system for performing MTS, according to one embodiment.

FIG. 8 illustrates a spectroscopy system 800 for performing MTS, according to one embodiment. Starting at the left, in one embodiment, one optical fiber transmits an unmodulated signal 801 while another optical fiber transmits the modulated pump optical signal 125. The optical signals 801 and 125 can be generated using the same optical source or different optical sources.

In one embodiment, the signals 801 and 125 are converted to free-space optical signals. The unmodulated signal 801 is transmitted to a splitter 840 which splits the unmodulated signal 801 to output the unmodulated reference optical signal 120 and an unmodulated probe optical signal 835. In one embodiment, the splitter 840 is designed such that the intensity of the reference optical signal 120 approximately matches the probe optical signal 835 in the vapor cell 105.

Both the probe optical signal 835 and the reference optical signal 120 are input into the vapor cell 105 through, for example, a transparent side of the vapor cell 105.

In parallel, the modulated pump optical signal 125 is transmitted to a splitter 815 that redirects a portion of the pump optical signal 125 to a PD 820. The splitter 815 and the PD 820 can be used to detect residual amplitude modulation (RAM) on the pump beam and servo it out with the control system.

The remaining portion of the pump optical signal 125 is transmitted to a splitter 825. In this embodiment, the splitter 825 permits substantially all of the pump optical signal 125 to pass therethrough. For example, the pump optical signal 125 may have a polarization that permits it to pass through the splitter so that substantially none of the signal 125 is reflected by the splitter 825. Instead, the pump optical signal 125 enters the vapor cell 105.

The pump optical signal 125 can pass through the vapor cell 105 1, 2, 3, or N number of times. In FIG. 8, the system 800 includes the mirrors 830B and 830C to pass the optical signal 125 through the vapor cell 105 two times. Further, the optical path of the pump optical signal 125 is aligned with the optical path of the probe optical signal 835 in the vapor cell 105. In this example, the pump optical signal 125 and the probe optical signal 835 have a shared optical path but travel in opposite directions along that path. For example, if the pump optical signal 125 and the probe optical signal 835 only passed through the vapor cell 105 once, then the probe optical signal 835 and the pump optical signal 125 may be input into the vapor cell 105 on opposite sides.

After passing through the vapor cell 105 N number of times, the probe optical signal 835 reaches the beam splitter 825 which redirects this signal onto the mirror 830A. That is, while the beam splitter 825 is transparent to the pump optical signal 125, the splitter 825 reflects the probe optical signal 835 towards the mirror 830A (due to its polarization) which then directs the signal 835 to the control system 110. Thus, the splitter 825 is used to separate the probe optical signal 835 from the pump optical signal 125. The control system 110 can detect whether or not the modulation in the pump optical signal has been transferred onto the probe optical signal 835. This information can then be used to adjust the wavelength of the optical source (not shown) generating the pump optical signal 125.

The reference optical signal 120 can also pass through the vapor cell 105 N number of times before being detected by the control system 110. Further, the reference optical signal 120 can pass through the vapor cell 105 a non-integer number of times.

In one embodiment, the reference optical signal 120 passes through the vapor cell 105 the same number of times as the probe optical signal 835. However, in another embodiment, the reference optical signal 120 passes through the vapor cell 105 fewer, or more, times than the probe optical signal 835. In either case, the splitter 840 can be designed such that the intensity of the reference optical signal 120 in the vapor cell 105 approximately matches the intensity of the probe optical signal 835. Moreover, the length of the optical path of the reference optical signal 120 in the vapor cell 105 does not have to equal the length of the optical path of the probe optical signal 835 to achieve the benefits described herein, so long as the optical powers and electronic gains are optimized. Thus, the reference optical signal 120 can pass through the vapor cell 105 a different number of times than the probe optical signal 835.

The control system 110 can use any of the embodiments discussed in FIGS. 2-4 (or any other suitable vector subtraction techniques) to measure the probe optical signal 835 and the reference optical signal 120 and perform vector subtraction, as previously described.

In an alternative embodiment, the spectroscopy system can include a separate secondary vapor cell through which the reference optical signal 120 passes. That is, the reference optical signal 120 may pass through a different vapor cell than the optical signals 835 and 125. The reference optical signal 120 experiences absorption when passing through the second vapor cell, which converts laser phase noise to amplitude noise like the other optical signals passing through the vapor cell 105. Thus, the same advantages of using the reference optical signal 120 can be obtained whether the reference optical signal 120 passes through the same vapor cell as the optical signals 835 and 125 or a different vapor cell (e.g., a second vapor cell).

Figure 9:
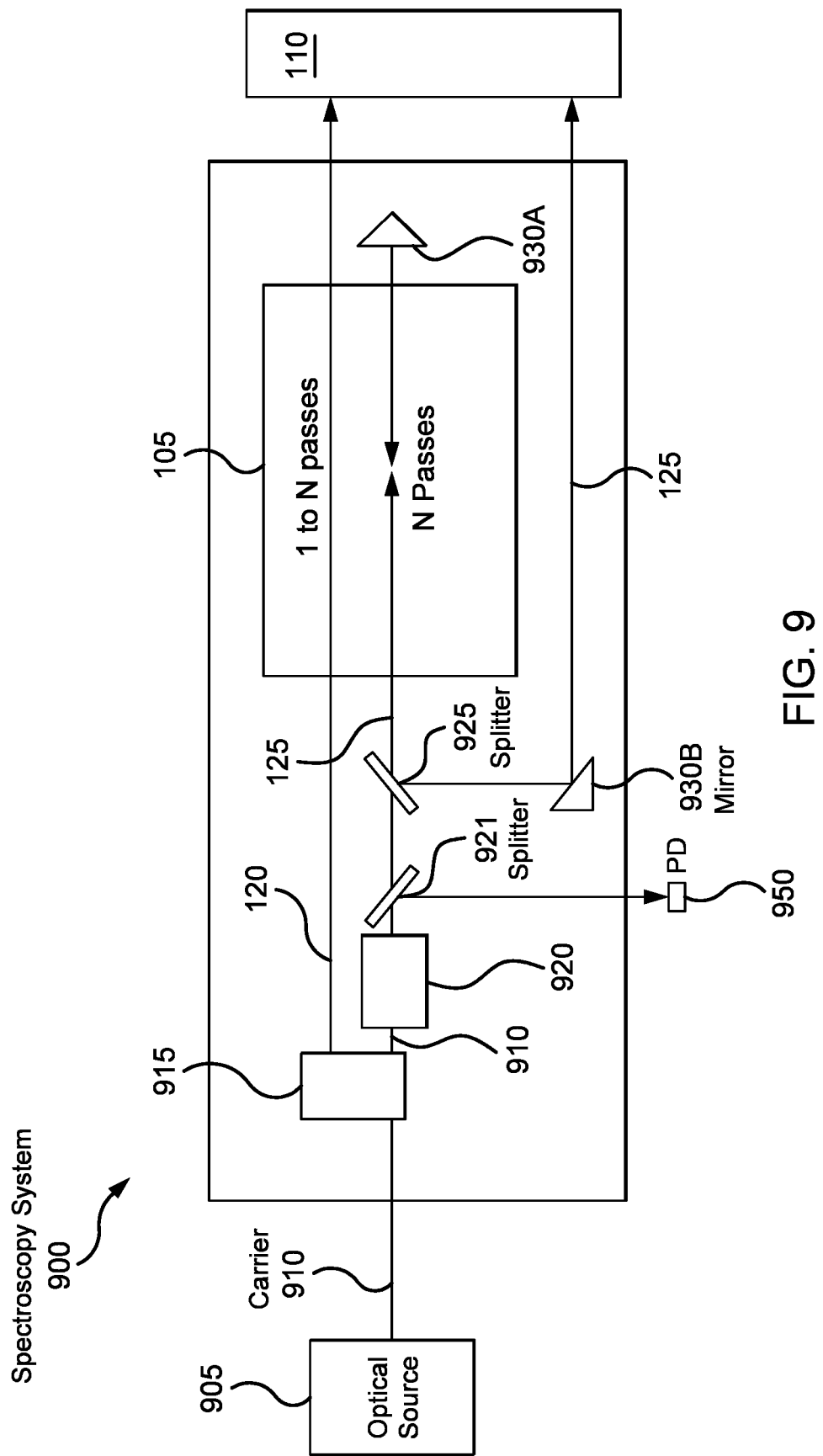
FIG. 9 is a block diagram of a spectroscopy system for performing Frequency Modulation Spectroscopy, according to one embodiment.

FIG. 9 is a block diagram of a spectroscopy system 900 for performing FMS, according to one embodiment. Unlike in MTS, this example of FMS does not use a separate probe optical signal.

The system 900 includes an optical source 905 that outputs a carrier optical signal 910 which is then split by a beam splitter 915 to form the reference optical signal 120. The remaining portion of the carrier optical signal 910 is modulated by the modulator 920 to generate the modulated pump optical signal 125.

Both the reference optical signal 120 and the pump optical signal 125 pass through the vapor cell 105, but use different optical paths. That way, the modulation on the pump optical signal 125 is not transferred onto the reference optical signal 120.

Both the reference optical signal 120 and the pump optical signal 125 are measured by the control system 110 which can suppress noise as discussed above in FIGS. 1-5. Moreover, the control system 110 can use the measured pump optical signal 125 to generate the laser adjustment signal 115 to change the wavelength of the carrier signal 910 output by the optical source 905.

The modulator 920 could be an electro-optic modulator (EOM) or an acousto-optic modulator (AOM).

A splitter 921 redirects a portion of the pump optical signal 125 to PD 950. The splitter 921 and the PD 950 can be used to measure and remove RAM from the modulated pump beam 125 as discussed above.

The remaining portion of the pump optical signal 125 passes through another beam splitter 925 and enters the vapor cell 105. In this example, the pump optical signal 125 passes through the vapor cell 105 twice since the opposite end of the vapor cell 105 includes a mirror 930A (e.g., a reflector) which reflects the signal 125 back through the vapor cell 105. However, additional mirrors can be used so that the pump optical signal 125 passes through the vapor cell 105 any number of times (e.g., N number of times).

After again reaching the splitter 925, the pump optical signal 125 is reflected down towards the mirror 930B, which reflects the signal 125 to the control system 110 where it is detected and measured. For example, a quarter waveplate (not shown) can be placed in front of mirror 930A. After going through this waveplate twice, the polarization of the signal 125 is flipped. Alternatively, the quarter waveplate may be disposed after splitter 925 but before the cell 105. In yet another embodiment, the splitter 925 could be a 50/50 beam splitter.

In parallel with the signal 125 passing through the cell 105, the reference optical signal 120 passes through the vapor cell 105 1, 2, 3, or N number of times. In one embodiment, the reference optical signal 120 passes through the vapor cell 105 the same number of times as the pump optical signal 125. However, in another embodiment, the reference optical signal 120 passes through the vapor cell 105 fewer, or more, times than the pump optical signal 125.

While FMS and MTS techniques are described, the embodiments are not limited to any particular type of spectroscopy technique. Further, the vapor cell 105 can have various shapes, sizes, and vapors (e.g., rubidium or iodine).

In an alternative embodiment, the reference optical signal 120 passes through a different vapor cell than the optical signal 125. In that case, the reference optical signal 120 still experiences absorption by the second vapor cell, which converts laser phase noise to amplitude noise like the other optical signals passing through the separate vapor cell 105. Thus, the same advantages of using the reference optical signal 120 can be obtained whether the reference optical signal 120 passes through the same vapor cell or a different vapor cell as the optical signal 125.

Additional embodiments for using a reference optical signal in a spectroscopy system are described in NOISE MITIGATION IN VAPOR CELL SPECTROSCOPY application Ser. No. 17/933,735 filed on Sep. 20, 2022 which is herein incorporated by reference in its entirety.

Figure 10:
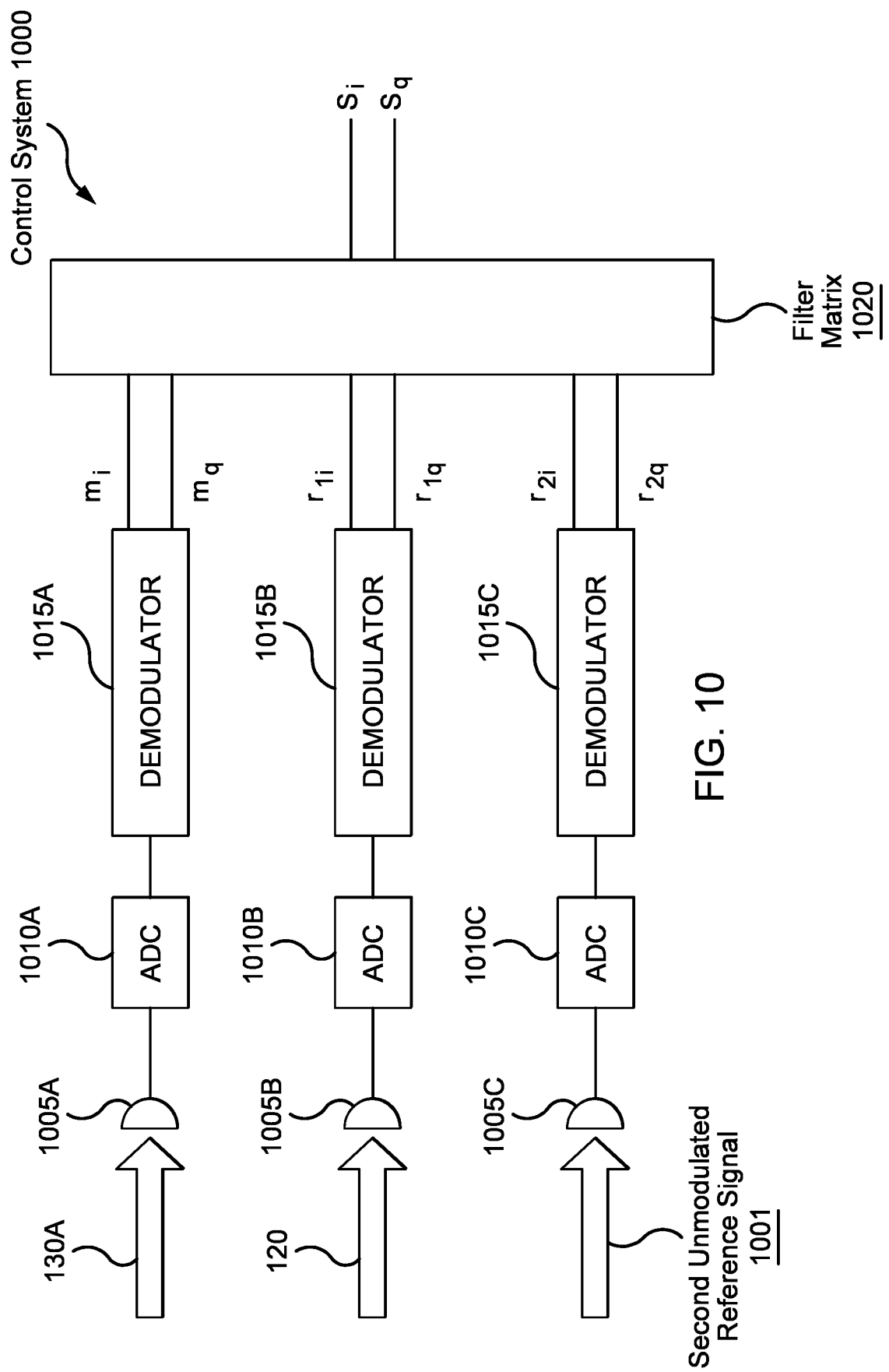
FIG. 10 is a block diagram of a spectroscopy system for performing vector noise subtraction, according to one embodiment.

FIG. 10 is a block diagram of a control system 1000 in a spectroscopy system for performing vector noise subtraction, according to one embodiment. The control system 300 receives the resulting signal 130A and the unmodulated reference signal 120 which are then converted into digital signals using the PDs 205 and ADCs 210. In addition, the control system 1000 receives a second unmodulated reference signal 1001. Unlike the reference signal 120, the second reference signal 1001 does not pass through a vapor cell. For example, the spectroscopy system may have a splitter that splits an unmodulated optical signal where one portion passes through a vapor cell to create the reference signal 120 but the other portion bypasses the vapor cell to create the second reference signal 1001.

Because the second reference signal 1001 does not pass through any vapor cell, the signal 1001 is not impacted by frequency noise. However, the reference signal 120 is impacted by intensity noise. Further, if the reference signal 120 and the second reference signal 1001 are both generated from the same optical source, then they both have the same intensity noise generated by the laser. By comparing the signals 120, 1001, the control system 1000 can discriminate between frequency noise and intensity noise. Put differently, the signals 120, 1001 provide a way for the control system 1000 to independently remove frequency and intensity noise.

FIG. 10 may be advantageous when there is both large intensity and frequency noise in the probe/pump optical signal. After being demodulated by the demodulators 1015, the resulting quadrature signals (i.e., $m_i$, $m_q$, $r_{1i}$, $r_{1q}$, $r_{2i}$, and $r_{2q}$) can be processed by a filter matrix 1020 (e.g., a 2×6 matrix) where vector subtraction can be performed to suppress noise. This can include suppressing both frequency and intensity noise, suppressing only frequency noise, or suppressing only intensity noise.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A spectroscopy system, comprising:
a vapor cell configured to receive as inputs an unmodulated reference optical signal and a modulated pump optical signal, wherein the unmodulated reference optical signal and the modulated pump optical signal have separate and non-crossing optical paths in the vapor cell; and
a control system configured to:
detect a first optical signal resulting from the unmodulated reference optical signal passing through the vapor cell and a second optical signal resulting from the modulated pump optical signal passing through the vapor cell, and
perform a vector subtraction of the first optical signal and the second optical signal to suppress noise.

2. The spectroscopy system of claim 1, wherein the control system is configured to:
phase shifting at least one of the first or second optical signals before performing the vector subtraction.

3. The spectroscopy system of claim 2, wherein the phase shifting is performed after the first and second optical signals have been converted into digital signals and demodulated.

4. The spectroscopy system of claim 3, wherein the control system is configured to phase shift the second optical signal using a rotation matrix and scale the second optical signal using a scaler.

5. The spectroscopy system of claim 2, wherein the phase shifting is performed after the first and second optical signals have been converted into digital signals but before being demodulated.

6. The spectroscopy system of claim 5, wherein the control system is configured to phase shift and scale the second optical signal using a delay block and a scaler circuit before performing the vector subtraction using a subtraction circuit.

7. The spectroscopy system of claim 1, wherein performing vector subtraction comprises using an adaptive algorithm in a feedback path of an adjustable filter.

8. The spectroscopy system of claim 1, wherein the control system is configured to perform Modulation Transfer Spectroscopy (MTS) using the modulated pump optical signal, the unmodulated reference optical signal, and a probe optical signal.

9. The spectroscopy system of claim 8, further comprising:
at least one reflector configured to reflect the probe optical signal back through the vapor cell after the probe optical signal has passed through the vapor cell at least one time.

10. The spectroscopy system of claim 1, further comprising:
at least one reflector configured to reflect the modulated pump optical signal back through the vapor cell after the modulated pump optical signal has passed through the vapor cell at least one time.

11. The spectroscopy system of claim 1, further comprising:
at least one reflector configured to reflect the unmodulated reference optical signal back through the vapor cell after the unmodulated reference optical signal has passed through the vapor cell at least one time.

12. The spectroscopy system of claim 1, wherein the control system is configured to perform Frequency Modulation Spectroscopy (FMS) using the modulated pump optical signal and the unmodulated reference optical signal.

13. The spectroscopy system of claim 1, further comprising:
a second unmodulated reference optical signal that does not pass through the vapor cell,
wherein the control system is configured to:
detect a third optical signal corresponding to the second unmodulated reference optical signal, wherein the vector subtraction is performed using the first, second, and third optical signals to suppress noise.

14. A method, comprising:
modulating input light to generate a modulated pump optical signal;
transmitting the modulated pump optical signal and an unmodulated reference optical signal through a vapor cell in a spectroscopy system using separate and non-crossing optical paths;
determining amplitude filter parameters from optical signals resulting from transmitting the modulated pump optical signal and the unmodulated reference optical signal through the vapor cell;
determining a phase difference from the resulting optical signals, wherein determining the amplitude filter parameters and the phase difference is performed during a calibration phase, the method further comprising, during an operational phase:
detecting a first optical signal resulting from the unmodulated reference optical signal passing through the vapor cell and a second optical signal resulting from the modulated pump optical signal passing through the vapor cell;
phase shifting at least one of the first or second optical signals based on the phase difference;
scaling at least one of the first or second optical signal based on the amplitude filter parameters; and
performing vector subtraction of the first optical signal and the second optical signal to suppress noise.

15. The method of claim 14, wherein the phase shifting is performed after the first and second optical signals have been converted into digital signals and demodulated.

16. The method of claim 14, wherein the phase shifting is performed after the first and second optical signals have been converted into digital signals but before being demodulated.

17. The method of claim 14, further comprising:
detecting a third optical signal corresponding to a second unmodulated reference optical signal, wherein the second unmodulated reference optical signal does not pass through the vapor cell, and wherein the vector subtraction is performed using the first, second, and third optical signals to suppress noise.

18. The method of claim 14, further comprising:
performing MTS using the modulated pump optical signal, the unmodulated reference optical signal, and a probe optical signal.

19. The method of claim 14, further comprising:
reflecting the modulated pump optical signal back through the vapor cell after the modulated pump optical signal has passed through the vapor cell at least one time; and
reflecting the unmodulated reference optical signal back through the vapor cell after the unmodulated reference optical signal has passed through the vapor cell at least one time.

20. A spectroscopy system, comprising:
a first vapor cell configured to receive as an input an unmodulated reference optical signal;
a second vapor cell configured to receive as an input a modulated pump optical signal; and
a control system configured to:
detect a first optical signal resulting from the unmodulated reference optical signal passing through the first vapor cell and a second optical signal resulting from the modulated pump optical signal passing through the second vapor cell, and
perform a vector subtraction of the first optical signal and the second optical signal to suppress noise.

* * * * *